United States Patent [19]
Yoon

[11] Patent Number: 5,377,087
[45] Date of Patent: Dec. 27, 1994

[54] PASSENGER READING LIGHT

[75] Inventor: Alex Yoon, Plano, Tex.

[73] Assignee: Gulton Industries, Inc., Plano, Tex.

[21] Appl. No.: 821,417

[22] Filed: Jan. 15, 1992

[51] Int. Cl.$^5$ ............................................. F21V 21/29
[52] U.S. Cl. ............................... 362/275; 362/148;
362/287; 362/372; 362/374; 362/421
[58] Field of Search ............... 362/364, 374, 404, 421,
362/429, 147, 148, 275, 274, 273, 287, 288, 289,
202, 205, 150, 372

[56] References Cited

U.S. PATENT DOCUMENTS

| | | | |
|---|---|---|---|
| 1,071,957 | 9/1913 | Rawson | 362/421 |
| 1,435,296 | 11/1922 | Head | 362/274 |
| 1,494,821 | 5/1924 | Stearns | 362/421 |
| 1,687,821 | 10/1928 | Aldeen | 362/421 |
| 2,341,822 | 2/1944 | Seal | 362/202 |
| 2,554,258 | 5/1951 | Lundquist | 362/364 |
| 2,649,535 | 8/1953 | Feder | 362/275 |
| 2,733,335 | 1/1956 | Falge | 362/273 |
| 2,910,575 | 10/1959 | Meschwitzer et al. | 362/273 |
| 3,653,021 | 3/1972 | Litman et al. | 340/258 B |
| 3,697,742 | 10/1972 | Bobrick | 362/364 |
| 3,778,609 | 12/1973 | Liberman | 362/364 |
| 3,803,400 | 4/1974 | Ozawa | 362/372 |
| 3,836,763 | 9/1974 | Hoffman et al. | 362/374 |
| 4,142,227 | 2/1979 | Aikens | 362/74 |
| 4,173,037 | 10/1979 | Henderson, Jr. et al. | 362/275 |
| 4,475,147 | 10/1984 | Kristofek | 362/364 |
| 4,517,628 | 5/1985 | McDermott | 362/202 |
| 4,636,924 | 1/1987 | Targetti | 362/277 |
| 4,694,381 | 9/1987 | Dedoro | 362/307 |
| 4,751,627 | 6/1988 | Usher | 362/421 |
| 4,754,377 | 6/1988 | Wenman | 362/364 |
| 5,222,801 | 6/1993 | Neer | 362/287 |

FOREIGN PATENT DOCUMENTS

| | | | |
|---|---|---|---|
| 0833908 | 8/1938 | France | 362/374 |
| 1218176 | 12/1959 | France | 362/374 |

Primary Examiner—Stephen F. Husar
Assistant Examiner—Alan B. Cariaso
Attorney, Agent, or Firm—Darby & Darby

[57] ABSTRACT

An orientable passenger reading light is provided for vehicles having a two-part removable bezel arrangement. The lower part of the bezel is freely rotatable to disguise the method of relamping by requiring correct manipulation of the upper bezel part to allow release and removal of the bezel arrangement. A continuously adjustable ball and socket arrangement permits varying the orientation of the light over a wide range such as a 25 degree spherical zone. A simplified locking mechanism may be engaged in any position without tools, to prevent adjustment by passengers. When the locking mechanism is disengaged, enough friction is provided to maintain the orientation despite environment vibration.

9 Claims, 3 Drawing Sheets

PASSENGER READING LIGHT

FIELD OF THE INVENTION

The present invention relates to adjustable reading lamps and like lighting fixtures, particularly for passengers in vehicles.

BACKGROUND OF THE INVENTION

Mass transit vehicles, such as airplanes, buses and railway trains customarily include overhead lighting fixtures, each individual to single passenger seat or small group of seats, which are desirably adjustable as to orientation for the convenience of the user.

An object of the present invention is to provide a readily orientable reading lamp useful for passenger lighting in vehicles.

A further object is to provide a reading lamp fixture which may be adjustable by a passenger or alternatively may be locked in fixed position.

Another object is to provide a reading lamp fixture for vehicles or the like which inhibits access by the general public to the lamps in those fixtures.

SUMMARY OF THE INVENTION

An orientable passenger reading light is provided for vehicles having a two-part removable bezel arrangement. The lower part of the bezel is freely rotatable to disguise the method of relamping by requiring correct manipulation of the upper bezel part to allow release and removal of the bezel arrangement. A continuously adjustable ball and socket arrangement permits varying the orientation of the light over a wide range such as a 25 degree spherical zone. A simplified locking mechanism may be engaged in any position, without tools, to prevent adjustment by passengers. When the locking mechanism is disengaged, enough friction is provided to maintain the orientation despite environment vibration.

Arrangements are provided for permitting the lamp housing to be oriented over a wide range of orientations within a generally conical configuration, while allowing the lamp housing to retain an orientation to which it has been adjusted. Alternatively or additionally means are also provided for locking the lamp housing in a fixed orientation or for confining the range of orientations to a single plane.

BRIEF DESCRIPTION OF THE DRAWINGS

The preferred embodiment of the invention is explained below with reference to the accompanying drawings, in which.

DESCRIPTION OF PREFERRED EMBODIMENT

Figure 1:
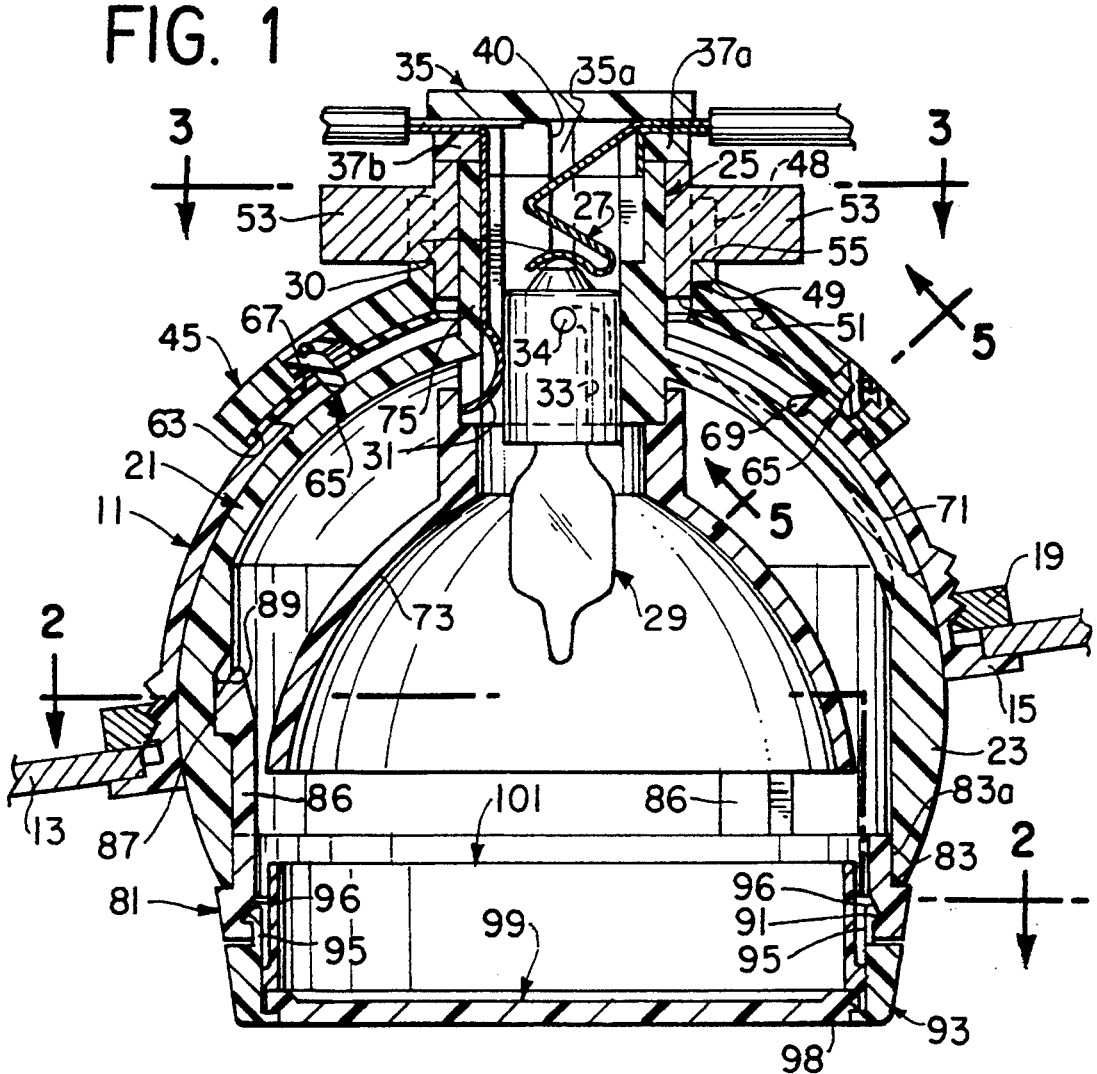
FIG. 1 is a cross-sectional elevation view taken in the plane of the axis of the reading light of the invention as mounted on a panel.

The present reading light comprises a stationary casing 11 adapted to be secured to a bulkhead or overhead panel 13 on which the reading light of the invention is to be mounted in appropriate position relative to a passenger. Casing 11 is in the form of a portion of a sphere, which is substantially a hemisphere with its "polar" region open. It has a flange 15 at its open end and a threaded section 17 adjacent thereto. The reading light is adapted to be mounted on the panel 13 which has an opening sized to accept the reading light, with the flange 15 abutting the panel 13. A nut 19 may engage the threaded section 17 to clamp the casing 11 to the panel 13 between the flange 15 and the nut 19. The casing 11 is thus fixed to the vehicle.

Slidably engaged within casing 11 is a lamp housing 21 having a generally spherically shaped lower portion 23 mating inside casing 11 and a generally cylindrical lamp housing extension 25 extending through the upper central opening in the casing 11. The extension 25 supports a holder 37a for an electrical contact 27 for contacting the center terminal 30 of a conventional lamp 29, and also supports a holder 37b for a second electrical contact 31 for contacting the side or shell terminal 31 of lamp 29. Sockets 37a and 37b are positioned between respective pairs of legs 41 and 43 formed on a lamp housing cap 35. The lamp housing extension 25 is generally cylindrical in shape and may have a conventional L-shaped internal channel 33 (seen in FIG. 1) cooperating with a projection 34 on the lamp 29 to provide a bayonet-type connection between the lamp 29 and the lamp housing extension 25. Lamp housing cap 35 is joined to the lamp housing extension 25 as by means of side legs 35a which snap under ledges 38 inside grooves 40 formed in the sides of the lamp housing extension 25. Thus, the lamp housing 21, its extension 25 and the cap 35 form a unitary assembly.

A reflector formed of a molded shell with a highly light-reflecting inner coating 73 may be secured to a portion of the lamp housing extension 25 extending within the spherical lower section 23, as seen in FIG. 1.

Figure 6:
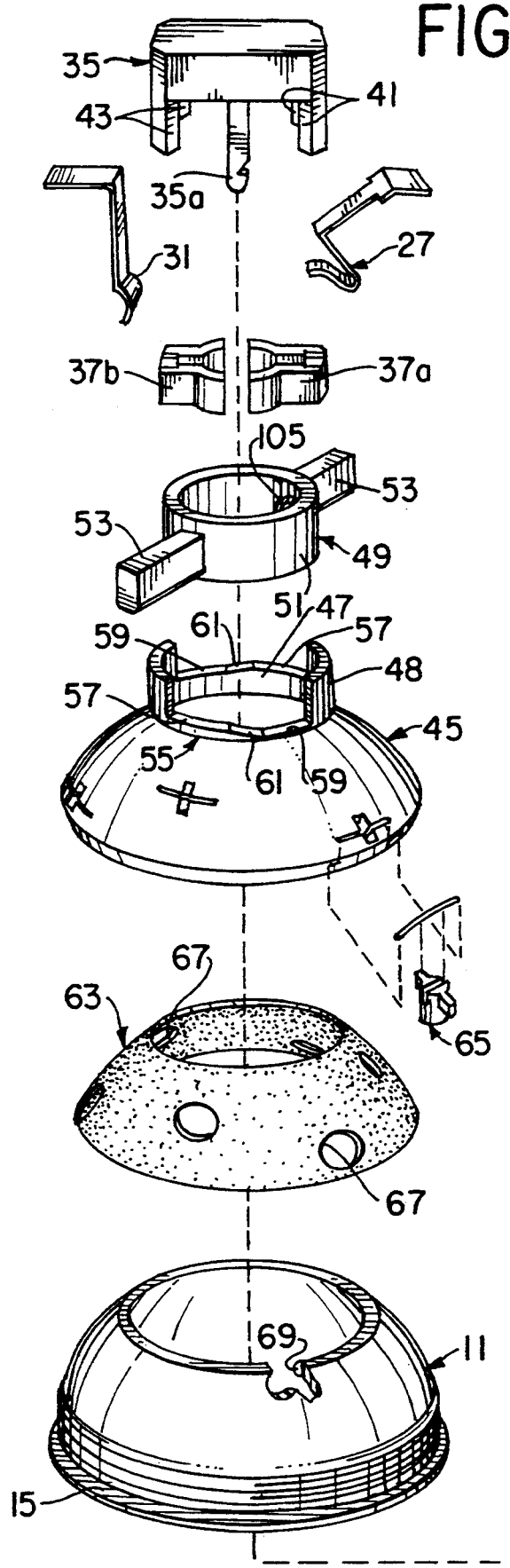
FIG. 6 is an exploded view showing the various components of the reading light of the invention.
Figure 6:
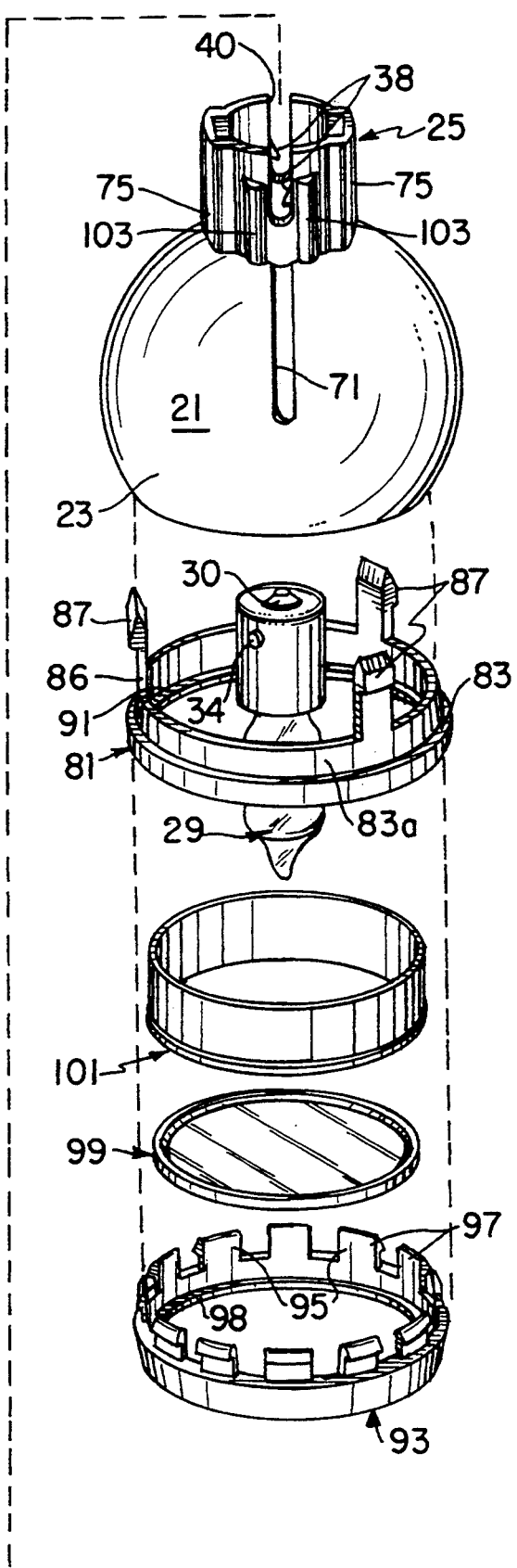

Surrounding the lamp housing extension 25 is a lock actuator 49 having a central cylindrical body 51 and a pair of radially projecting locking arms 53. Between the lock actuator 49 and the stationary casing 11 is molded pressure cap 45 having a generally spherical shape with its inner surfaces congruent to the outer spherical surface of casing 11. As seen in FIG. 6, the lamp housing extension 25 while generally cylindrical in form has two regions 75 which extend outwardly beyond the remainder. These regions 75 also are positioned between the leg pairs 41, 43 of the lamp housing extension cap 35 so that the lamp housing extension 25 and extension cap 35 when assembled form essentially a cylindrical surface about which is placed the cylindrical body 51 of the lock actuator 49.

Cap 45 has a central opening 47 and a part-cylindrical extension 48 which surrounds the cylindrical body 51 of the lock actuator 49 and has cut away areas which accommodate the locking arms 53. The cut-away areas of cap 45 have two cylindrical camming surfaces 55 extending upward from the spherical surface of cap 45. Each camming surface 55 cooperates with a respective one of the two locking arms 53. Each camming surface 55 has a raised cam portion 57 joined to a depressed cam portion 59 by a ramp cam portion 61. Since, as seen in FIG. 1, the lock actuator 49 is prevented from upward movement by cap 35, when the locking arms 53 are rotated from the depressed cam portion 59 over the ramp 61 to the raised portion 57 of the camming surfaces 55, the cap 45 will be moved downward toward the stationary casing 11.

In between cap 59 and stationary casing 11 is a layer 63 of resilient friction-providing material, such as silicone rubber. Layer 53 may be formed as a lining for cap 45, or may be a separate shell adhered to cap 45 or to stationary casing 11, or floating between them. It serves to prevent relative movement between cap 45 and casing 11 when those two members are urged together. Accordingly, when the locking arms are moved to the raised portions 57 of the camming surfaces 55, cap 45 and layer 63 are pressed against the casing 11 to hold the housing assembly including lamp housing 21 in its then assumed position relative to the stationary casing 11. By rotating the locking arms away from the raised cam portion 57 to the depressed cam portion 59 (by rotation through an angle illustratively of 70 degrees) the cap 45 and friction layer 63 are released from pressed contact with casing 11, permitting the lamp housing 21 and its connected assembly to be pivoted within the spherical stationary casing 11, and within the confines of the opening 27, so as to adjust the orientation of the lamp housing to direct light where desired.

Figure 3:
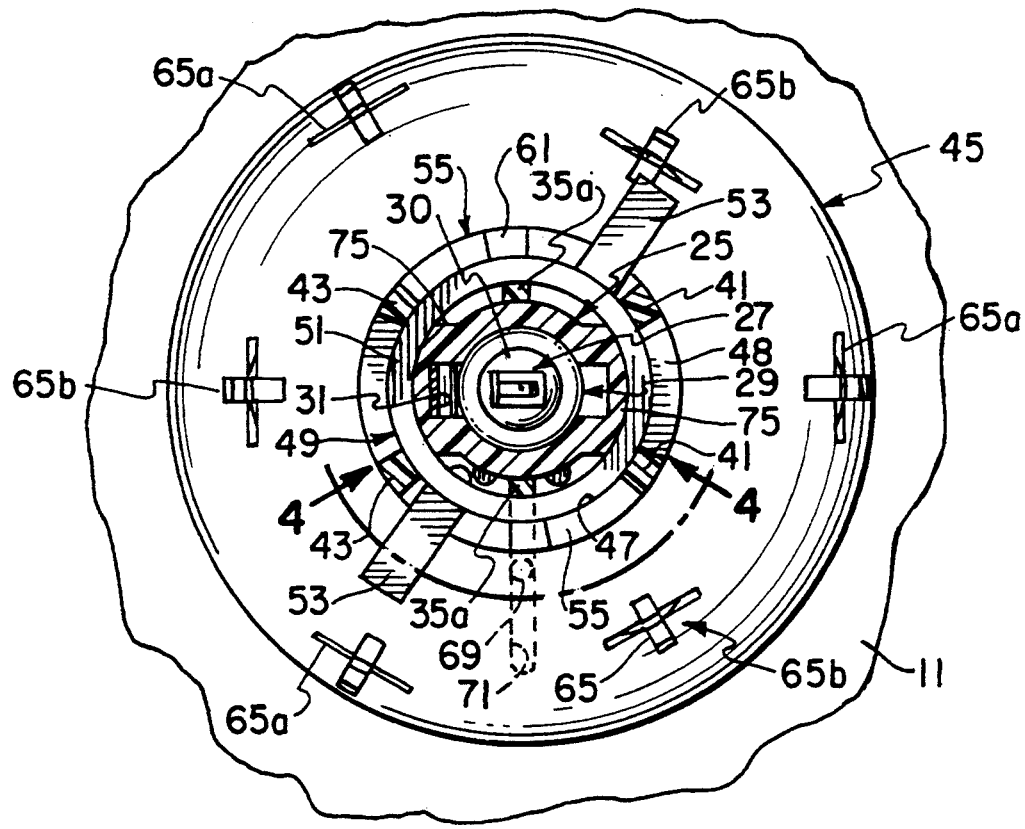
FIG. 3 is a further cross-sectional view of the device of FIG. 1 taken along line 3—3 thereof.
Figure 4:
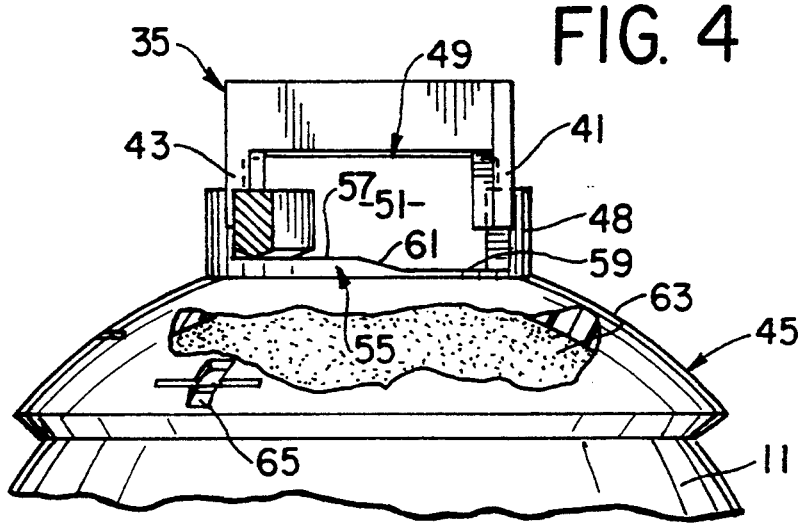
FIG. 4 is a fragmentary elevation view partly in sectional viewed along line 4—4 of FIG. 3.
Figure 5:
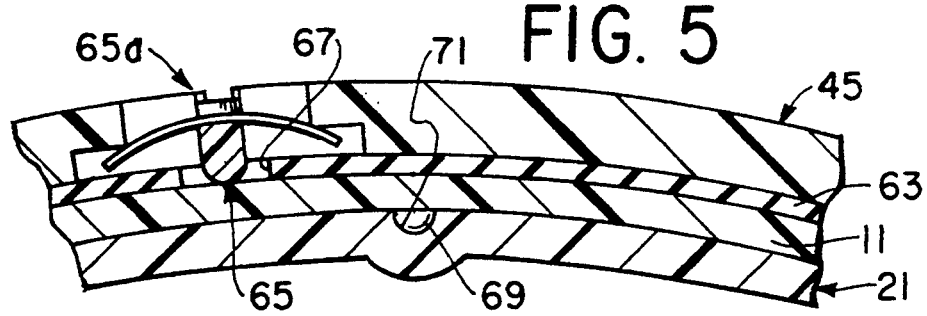
FIG. 5 is a cross-sectional view of a detail of FIG. 1 taken along line 5—5 thereof.

To permit the housing assembly to remain in an adjusted position when the locking arms 53 are in unlocked position, cap 45 is provided with spring-biased buttons 65 which pass through corresponding openings 67 in friction layer 63 to provide sufficient friction against the stationary casing 11 to retain the light housing in any rotated position while still permitting adjustment. FIG. 5 shows in greater detail one of the spring-biased buttons 65 which extends downward through an opening 67 in the friction layer 63 to bear against the stationary casing 11. As shown in FIG. 3, several button assemblies 65 are preferably distributed around that axis of the structure, in an outer ring 65a and an inner ring 65b of buttons, so that the buttons will be operative against the stationary casing 11 regardless of the extent of tilt of the lamp housing assembly with respect to the stationary casing 11. This creates sufficient friction between the cap 45 and the stationary casing 11 to retain the orientation of the lamp housing 21 where it has been adjusted, even when the locking assembly is disengaged.

In this way, with the locking arms in the disengaged position, the housing assembly may be rotated (as by a passenger in an aircraft) to a desired orientation for comfort and convenience. However, if it is desired to retain the housing assembly in a fixed orientation relative to the stationary casing 11 and the panel 13, the lock actuator arms 53 would be rotated to engage the raised portion 57 of the camming surface 55 to prevent rotation of the housing assembly, to clamp cap 45 to the casing 11. The lamp housing extension 25 may also be provided with protuberances 103 cooperating with a protuberance 105 on the inner end of one locking arm 53 to provide a detent arrangement permitting tactile recognition of the positioning of the locking arm 53 in either its extreme locked position shown in FIG. 3 or its unlocked position when the lock actuator 49 has been rotated to engage the locking arms 53 onto the lower or depressed portions of the camming surface 55.

It will be understood that suitable wires, not shown, connect the contact terminals 27, 31 to a source of electrical power for energizing lamp 29. Although the light housing may be oriented in various directions, it is desirable to avoid turning it through several turns, as this may injure the wires connected to the terminals 27, 31.

For this purpose an anti-rotation projection is formed within casing 11 as shown at 69 in FIG. 6, and a matching groove 71 is formed in the exterior of the lamp housing 21 so that the housing 21 may be restrained to tilting it with respect to stationary casing 11 in the plane of the groove 71. However, the housing may also be pivoted about projection 69, no matter where projection 69 is within groove 71. In this way the light housing may be oriented to direct light anywhere within a solid angle permitted by movement of lamp housing extension 25 within the top opening 70 of casing 11, without twisting the wires connected to terminals 27, 31. By making casing 11 slightly flexible, the projection 69 and groove 71 may serve merely as a detent for a preferred tilting of the lamp housing 21, while still permitting adjustment of the orientation of the lamp housing 21 as may be desired.

As thus far described, the invention provides a reading lamp suitable for mounting in a panel over a passenger's seat in an airplane or other vehicle. The lamp may be oriented in any desired direction (within a solid angle of up to about 25° on either side of the casing axis) by grasping the lower rim of the lamp housing 21 to adjust the direction of light, provided the locking arms 53 are disengaged from the raised portions 57 of the camming surfaces 55. Alternatively, by rotating the locking arms 53 up the ramps 61 of the camming surfaces 55 onto the raised portions 57 of camming surfaces, the orientation of the housing assembly may be locked into a fixed position and adjustment by passengers is thus prevented, where not desired.

The housing assembly is therefore a unitary arrangement of the lamp housing 21 with its extension 25, the contact holders 37a, 37b, with contacts 31, 27 and the extension cap 35 which holds and retains the lock actuator 49 and molded cap 45 within a limited axial movement of the latter with friction layer 63.

Figure 2:
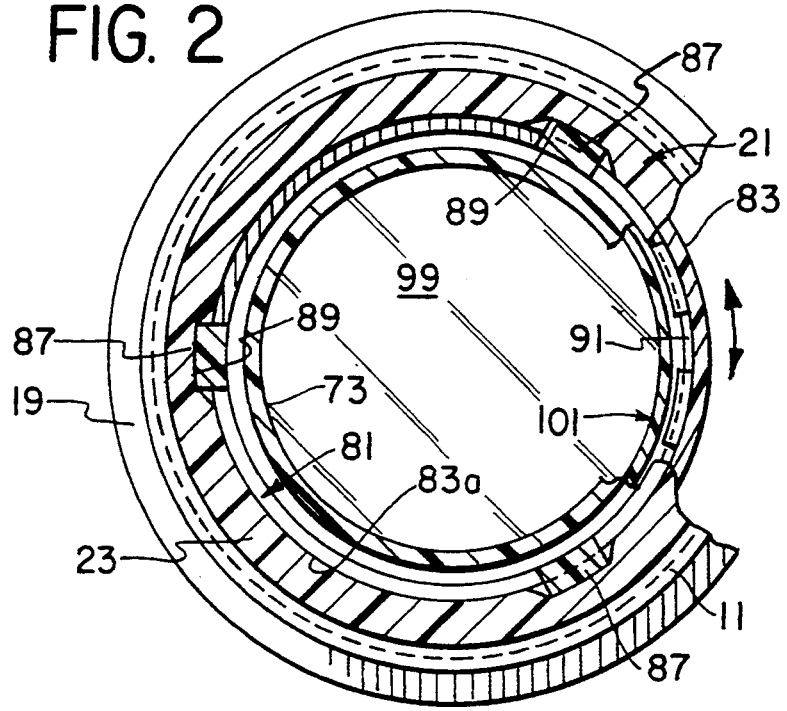
FIG. 2 is a partial cross-sectional view of FIG. 1 taken along line 2—2 thereof.

A special bezel arrangement is provided to permit authorized access to the lamp 29 while inhibiting such access from unauthorized persons. An upper bezel ring 81 of generally cylindrical configuration is provided with a ledge 83 extending therearound so that the bezel has a smaller diameter portion 83 above a larger diameter portion 85. The small diameter portion 83 is designed to fit snugly within the lower opening of the lamp housing lower section 23 as seen in FIG. 1. Extending upwardly from the smaller diameter portion 83 of the upper bezel ring 81 are a plurality (illustratively three in number) of arms 86 with hook-like projections 87. Formed within the inner surface of the housing 23 (which surface may have a cylindrical shape) are recesses 89 for receiving the projections 87, each recess 89 corresponding to one of the hook-like projections 87. Each recess 89 is provided with a shoulder or ledge which engages a hook portion 87 of an arm 86 to resist withdrawal of the bezel from the housing 23. Each recess 89 as shown in FIG. 2 merges into the inner surface of the housing 23 by a sloping recess wall, so that rotation of the bezel ring 81 will cause the respective projections 87 to be flexed inwardly by the camming action of the sloping wall regions of the recesses 89. Once the projections 87 are disengaged from their respective recesses 89, the bezel 81 and its assembly may be slid downwardly to remove the bezel, permitting relamping of the lamps where needed.

To inhibit this rotating actuation and removal of the bezel, the upper bezel is provided with a groove or ledge 91 on its inner surface. A lower bezel ring 93 is provided with a plurality of upwardly extending tabs 95 formed with hook-shaped tips 97 as seen in FIG. 6. The lower bezel ring contains an inwardly directed shoulder or ledge 98 on which rests a lens or light diffuser 99, which may be retained in position by a cylinder 101 frictionally engaging or cemented to the inner surface of the lower bezel ring 93. The tabs 95 are sufficiently flexible so that the lower bezel ring 93 may be pushed into the upper bezel ring to have the hooks 97 engage the groove or shoulder 91, which presents removal of ring 93. The lower bezel ring 93 is then freely rotatable relative to the upper ring 81. A passenger grasping the bezel ring 93 (as for adjustment of the light direction) would find that the lower bezel ring 93 rotates freely in his hand, so that it is not unhooked and cannot be removed. Only by rotating the upper bezel ring 91 until the hooks 83 are released from the recesses 89 can the bezel assembly be removed. Thus, both accidental and intentional removal of the bezel assembly is inhibited. As seen in FIG. 1, the upper bezel ring has only a very small region projecting below the light housing 23 which may be grasped for rotating the upper bezel ring to disengage the bezel assembly.

The exposed portion 103 of the lower bezel ring may be reduced in length in an axial direction so that the lower bezel ring 93 engages the lower edge of the housing 23. In such case grasping the lower bezel ring 93 and squeezing it may be designed to provide sufficient frictional engagement between the lower bezel ring 93 and the upper bezel ring to permit rotating the upper bezel ring for disengagement. This will further inhibit removal of the bezel assembly by unauthorized persons, who will be unaware of the need for such squeezing.

It will be understood that the present arrangement affords a simple construction for both fabrication and assembly. Each of the components may be readily molded of plastic material having suitable strength, rigidity and/or flexibility as required, although preferably the locking actuator is made of metal for additional strength and wear resistance. Assembly is simple, since the lower bezel ring 93 assembled with the lens or diffuser is merely snapped into the upper bezel ting, and the bezel assembly then snapped into the housing 23. Upon inserting the housing into the opening of the stationary casing 11, the friction layer 63 and the cap 45 are slid over the lamp housing extension together with the locking actuator. The contact holders 37, 39 are then positioned and the extension cap 31 is snapped into place to hold the housing assembly together while permitting the locking movement of the lock actuator and the friction cap 45. For simplicity of molding, the inner surface of the housing 23 may be made cylindrical to permit ready withdrawal from the mold and forming of the appropriate recesses.

It will be understood that the foregoing description is illustrative only, and variations may be made within the ordinary skill of the art without departing from the scope of the invention, which is defined by the appended claims.

What is claimed as the invention is:

1. An orientable lighting assembly comprising:
    a stationary hollow casing, having an outer surface and an inner surface,
    a lamp housing within said casing and having an outer shape substantially congruent to the inner surface of said casing, and slidably movable relative to said casing for altering the orientation of said lamp housing,
    a locking member on the outside of said casing having an inner surface substantially congruent to the outer surface of said casing and slidably movable relative to said casing together with said housing, and
    means creating friction between said locking member and said casing, said means comprising an array of friction buttons carried by said locking member and resiliently urged against said casing to retain said housing in position while allowing manual re-orientation of said housing relative to said casing.

2. A lighting assembly as in claim 1 further comprising a layer of frictional material between said casing and said locking member.

3. A lighting assembly as in claim 1 further comprising means actuatable to squeeze said casing between said housing and said locking member to retain said housing in position relative to said casing.

4. A lighting assembly as in claim 1 wherein said locking member is orientable together with said lamp housing.

5. A light assembly as in claim 1 further comprising
    a layer of frictional material between said locking member and said casing,
    said layer having openings at the locations of said buttons.

6. In a lamp having a lamp housing with an inner surface and an opening and a light-transmitting member over said opening,
    a bezel assembly housing said light-transmitting member in relation to said housing,
        said bezel assembly comprising a bezel member rotatable and axially slidable within said lamp housing and having a plurality of flexible inward extensions with hook-like projections,
        said lamp housing inner surface having a respective discrete recess cooperating with each said hook-like projection to prevent axial withdrawal of said bezel member from said housing when said projection is engaged in its recess, each recess having a lateral slanted surface connecting it to the inner surface of said housing, whereby upon rotating said bezel member said hook-like projections are moved out of said recesses by the camming action of said slanted surfaces, to permit said bezel member to be withdrawn axially from said housing.

7. A bezel arrangement as in claim 6 further including a second bezel member covering the outer face of said first bezel member and freely rotatable with respect thereto, whereby easy removal of said first bezel member by rotation of said second bezel member is inhibited by slippage of said second bezel member upon said first bezel member.

8. An orientable lighting assembly adapted for mounting on a panel or the like comprising:
    a stationary casing adapted to be secured to said panel and having a generally hemispherical configuration with an opening in a polar region thereof,
    a lamp holder assembly comprising a lamp housing within said casing and having an outer shape substantially congruent to the inner surface of said casing, said housing having a generally cylindrical lamp holder extension extending outwardly therefrom through said casing opening,
    a locking member on the outside of said casing and having an inner surface substantially congruent to the outer surface of said casing, and also having a generally central opening, said lamp holder extension through said latter opening, said locking member having a cylindrical extension surrounding said lamp holder extension, said locking member extension having a rim portion with two camming areas, each comprising a depressed region and a raised region, said regions being connected by a ramp region, a lock actuator surrounding said lamp holder extension and within said locking member extension, said actuator having a pair of locking arms extending outwardly thereof and each adapted to engage a camming area, a closure cap connected to said lamp holder extension and retaining said locking member for axial movement with respect to said lamp holder extension to cause said locking member to frictionally engage said casing to hold said lamp housing in its orientation relative to said casing, and a bezel arrangement holding a light-transmitting member over an opening in said housing, said bezel arrangement being rotatable with respect to said lamp housing and having a plurality of inward extensions with hook-like terminals, said lamp housing having respective recesses cooperating with said hook-like terminals to prevent withdrawal of said bezel arrangement from said housing, each recess having a slanted surface connecting it to the inner surface of said housing whereby upon rotating said bezel member said hook-like projections are moved out of said recesses by the camming action of said slanted surfaces, to permit said bezel arrangement to be withdrawn from said housing.

9. A lighting assembly comprising a generally hemispherical casing, a light housing having an outer partially spherical surface generally congruent to the inner surface of said casing, and slidably mounted therein for tilting in various directions with respect to the casing, a retaining member on the outside of said casing and having an inner surface substantially congruent to the outer surface of said casing, said retaining member being slidably mounted on said casing for tilting movement together with said light housing, and a plurality of frictional devices on said retaining member, each resiliently urged towards said casing, for providing friction between said retaining member and said casing to frictionally hold said housing in any assumed orientation of said light housing relative to said casing, said frictional devices being arranged in a first ring adjacent a lower edge of said retaining member and in a second ring concentric with said first ring, so as to engage said casing in various tilted positions of said retaining member.

* * * * *